Patented Dec. 5, 1939

2,182,171

UNITED STATES PATENT OFFICE 2,182,171

CALF FEEDING SUPPLEMENT

James M. Coyner, Madison, Wis., assignor to Armour and Company, Chicago, Ill., a corporation of Illinois No Drawing. Application February 16, 1938, Serial No. 190,875

2 Claims. (Cl. 167—53)

This invention relates to a calf feeding supplement and it comprises a composition containing pulverized bone meal, calcium lactate, calcium gluconate and calcium carbonate.

It has been common experience that scours or diarrhea is the greatest source of loss to the calf raiser because it causes more deaths and losses than from all other causes combined. This disease sets in during the milk-feeding period of the life of the calf, usually from the first few days up to about six months. The greatest losses occur when the calves are only a few days old and dairymen frequently refer to the so-called ten-day scours. These are very severe, and the calf frequently develops pneumonia often resulting in death and always followed by a slow recovery in cases that are not fatal.

Hitherto the universal belief has been that germs were the primary cause of calf scours, and calves have been treated to destroy the germs. In my investigations of this problem I have learned that any method directed to preventing scouring should be applied to the feed of the calf and not to the calf itself, or should be used in conjunction with the feed. I have further learned that the milk which the calf consumes is the primary cause of scours in practically all cases. Consequently, I have set myself to the problem of correcting abnormalities in the milk fed to the calf. Actually, I am, in the present invention, correcting the digestive processes in the calf's stomach so that abnormality in the milk fed no longer damages the intestinal tract.

In the course of my discoveries I have learned that those abnormalities in milk which cause calf scours are due to three things. The first is deficiency in calcium and phosphorus, the second is absence of carbonic acid, and the third the presence of spore-forming organisms which multiply into vast numbers in the intestinal tract and attack the proteins of the milk, converting them into very poisonous compounds which seriously upset the calf.

These abnormalities in the milk affect its digestion in a very definite way. This may be more clearly understood from a brief statement of how the calf digests normal milk. Milk taken into the stomach is quickly coagulated by the rennin. In a few moments it coagulates and normally, the coagulated curd toughens and shrinks into a tough clot having less than ten percent the size of the original volume of the milk. This shrinking action squeezes out the whey. The whey contains milk sugar and it passes from the stomach into the intestinal tract leaving the rubbery clot of casein in the stomach to be slowly dissolved by the pepsin. Meanwhile, lactic acid bacteria develop within the clotted mass of curd. This is advantageous for several reasons. The lactic acid formed toughens the curd and prevents the development of proteolytic bacteria which would attack the proteins and convert them into harmful compounds. Moreover, the tough curd holds the fat within the clotted mass and prevents the fat from coming in contact with the secretive walls of the stomach which would retard gastric secretion.

In order for the milk to coagulate in the manner stated, namely the formation of a tough clot of curd, the casein should not be denatured, sufficient calcium and phosphorous ions should be present to combine with the casein to form the characteristic clot, and the hydrogen ion concentration should be such that the rennin is activated.

Post mortems of large numbers of test calves making normal growth and others that were scouring and thin have always showed differences in the character of the curd. Those calves which have shown favorable growth with an absence of scouring have clots of tough rubbery curd in the milk stomach. Those calves which have developed scours reveal soft curds pitted with gas holes.

As a result of my experiments I have discovered a composition of matter which, when either added to the milk in the case of hand-fed calves, or given to nursing calves just prior to nursing, corrects abnormalities in the formation of the curd in the stomachs and thus prevents scouring. The composition of the present invention corrects abnormal milk so that it will produce the tough rubbery curd that has been found essential to milk digestion in the calf.

My composition comprises a mixture of powdered bone meal, calcium lactate, calcium gluconate and precipitated calcium carbonate. A preferred proportion is as follows:

| | Per cent |
|---|---|
| Finely pulverized bone meal (50–100 mesh) | 50 |
| Calcium lactate | 20 |
| Calcium gluconate | 20 |
| Precipitated calcium carbonate | 10 |
| | 100 |

Permissible variations can be made, however, and good results are obtained when there is thirty to 50 percent of bone meal, ten to thirty percent of calcium carbonate, ten to twenty percent of calcium lactate and ten to twenty percent of calcium gluconate.

These ingredients are finely powdered and mixed together to give a homogeneous composition of matter. For best results the powdered bone meal should have the mesh stated above.

The composition of my invention is used as follows.

For hand-fed calves I add one round teaspoonful per calf to the milk per feeding. For nursing calves I place one round teaspoonful on the calf's tongue before nursing.

These four constituents are essential for success. Each of them appears to perform specific functions, and they appear to cooperate with each other to give more than any mere additive effect. The bone meal should be finely powdered. In the calf's stomach it remains in suspension and supplies the additional phosphate ions necessary for the clotting of the milk. Moreover, it probably serves another purpose because of its content of proteins, and these proteins appear to induce a flow of the gastric juice. The bone meal also acts as a reserve in neutralizing excess acidity as it develops.

The calcium lactate supplies calcium ions and, by hydrolysis, furnishes some lactic acid which toughens the curd so that the whey will be expelled. The lactic acid also prevents the growth of proteolytic bacteria.

The calcium carbonate supplies carbon dioxide. In fresh milk there is seven to ten percent by volume of carbon dioxide. The calcium carbonate in my composition aids in establishing the right hydrogen ion concentration for the coagulation of the milk and aids in maintaining a high concentration of calcium and phosphate ions.

The action of the calcium gluconate is less clearly understood, but it is an observed fact that the composition does not function in the manner claimed unless the calcium gluconate is present. It undoubtedly furnishes calcium ions but seems to have a more obscure action due to the presence of either gluconic acid or un-ionized calcium gluconate.

The feeding supplement of the present invention inhibits the growth of harmful bacteria of spore-forming nature which are certain to get into milk that is hand-fed.

My composition has been fed to calves in many different localities throughout the country and has shown marked value in totally preventing scours or in curing scouring calves of the disease.

Additional ingredients can, of course, be added to my composition without departing from its essential characteristics.

Having thus described my invention, what I claim is:

1. A calf feeding mineral supplement comprising about thirty to fifty percent bone meal, ten to thirty percent calcium carbonate, ten to twenty percent calcium lactate and ten to twenty percent calcium gluconate.

2. A calf feeding mineral supplement comprising about fifty percent bone meal, twenty percent calcium lactate, twenty percent calcium gluconate and ten percent calcium carbonate.

JAMES M. COYNER.